UNITED STATES PATENT OFFICE.

GEORGE THOMPSON, OF EAST TARENTUM, PENNSYLVANIA.

IMPROVEMENT IN PROCESSES OF PUTTING UP CAUSTIC ALKALI.

Specification forming part of Letters Patent No. 19,957, dated October 21, 1856; reissue No. 654, dated February 1, 1859; reissue No. 2,570, dated April 16, 1867.

DIVISION B.

*To all whom it may concern:*

Be it known that I, GEORGE THOMPSON, late of East Tarentum, county of Allegheny, State of Pennsylvania, have invented a new and useful process for putting up caustic alkali (soda or potassa) in metallic integument or casing, for the purpose of producing, as an article of manufacture, caustic alkali in a state which will not deliquesce, and which can be preserved in small quantities suitable for family use.

I have described and claimed in another specification the new article of manufacture so produced; but what I wish to describe and claim in this specification is a convenient mode of putting up or inclosing said caustic alkali in metallic integument or casing; and I do hereby declare the following to be a full and exact description of the said process.

I provide boxes or canisters, of sheet-iron or other metal, made tight at the joints with infusible cement or otherwise, and into these I pour the caustic alkali, in a molten state, until they are nearly or quite full. The lid is then pressed down, so as to exclude air or moisture, and is secured by cement or otherwise.

Having thus described my process, what I desire to claim here is—

The process of putting up caustic alkali in metallic casing or integument by pouring the molten caustic alkali into the casing, substantially as above described, and then closing up the top of the case.

GEORGE THOMPSON.

Witnesses:

GEO. E. BUCKLEY,
J. E. SHAW.